US005999865A

United States Patent [19]

Bloomquist et al.

[11] Patent Number: 5,999,865

[45] Date of Patent: Dec. 7, 1999

[54] AUTONOMOUS VEHICLE GUIDANCE SYSTEM

[75] Inventors: Leif Alan Bloomquist, Willowdale; Eric Herbert Hinton, Lively, both of Canada

[73] Assignee: Inco Limited, Toronto, Canada

[21] Appl. No.: 09/015,697

[22] Filed: Jan. 29, 1998

[51] Int. Cl.[6] .......... G05D 1/00

[52] U.S. Cl. .......... 701/25; 701/23; 701/200; 701/209; 318/580

[58] Field of Search .......... 701/23, 25, 50, 701/217, 200, 123, 224, 209, 214; 180/169; 318/580, 587; 340/990

[56] References Cited

U.S. PATENT DOCUMENTS

| | | | |
|---|---|---|---|
| 4,465,155 | 8/1984 | Collins | 180/169 |
| 4,700,301 | 10/1987 | Dyke | 701/25 |
| 4,727,492 | 2/1988 | Reeve et al. | 364/424 |
| 4,790,402 | 12/1988 | Field et al. | 701/25 |
| 4,860,209 | 8/1989 | Sugimoto et al. | 701/25 |
| 4,918,607 | 4/1990 | Wible | 364/424.02 |
| 5,155,775 | 10/1992 | Brown | 382/1 |
| 5,530,330 | 6/1996 | Baiden et al. | 318/580 |
| 5,684,696 | 11/1997 | Rao et al. | 364/424.029 |
| 5,696,675 | 12/1997 | Nakamura et al. | 364/424.029 |
| 5,781,870 | 7/1998 | Okawa | 701/25 |
| 5,787,382 | 7/1998 | Kurabayashi | 701/25 |

FOREIGN PATENT DOCUMENTS

| | | |
|---|---|---|
| 2049773 | 2/1993 | Canada . |

*Primary Examiner*—William A. Cuchlinski, Jr.
*Assistant Examiner*—Gertrude Arthur
*Attorney, Agent, or Firm*—Blake T. Biederman; Edward A. Steen

[57] ABSTRACT

A system guides self-propelled equipment through passageways, such as underground mine corridors. The vehicle contains a signal generator for bouncing signals off the walls of the passageways. A receiver collects the signals bounced off of the passageways to determine the distance to side walls of the passageways. A storage device contains a set of interlinking nodes that represent at least one path through the passageways. Each of the nodes contains steering information. A processor finds the distance to the side walls of the passageways in order to steer the vehicle through the passageways. The system's operational state and method of steering changes depending upon the location of the equipment in the interlinking nodes.

20 Claims, 3 Drawing Sheets

OPERATOR

GOAL DEFINITION (& GUI)
TRAFFIC MANAGEMENT
LONG RANGE PLANNER
ROUTE PLANNER
ROUTE (FEATURE/ STATE LIST)
LOCAL PATH PLANNER
FEATURE IDENTIFICATION
STEERING ALGORITHM (CHANGES)
LASER RANGE DATA
STEERING/ THROTTLE SYSTEM
OBSTACLE DETECTION
BRAKING SYSTEM 1
2
3
4
5
6
7
8
9
10
11
12

DEAD END
1
CORRIDOR
2
3
DEAD END
INTERSECTION
4
5
CORRIDOR
6
INTERSECTION
7
DEAD END
DEAD END
9
CORRIDOR
10
CORRIDOR
8
INTERSECTION
11
12
CORRIDOR
TO REST OF LEVEL

X

Y
4000-100-200
4000-100-250
4000-150-250
4000-75-310 d
θ

AUTONOMOUS VEHICLE GUIDANCE SYSTEM

FIELD OF THE INVENTION

This invention relates to self-contained navigating systems for guiding vehicles. In particular, this invention relates to a system for guiding vehicles underground where global positioning satellites' signals do not penetrate.

BACKGROUND ART

The increasing interest in mine safety and efficiency has produced self-guided vehicles. Remote operation of underground vehicles will increase worker safety and reduce the costs incurred from the infrastructure needed to support miners. In the future, miners will perform several tasks over a video link and will be able to send the vehicles to their destinations using maps on a computer screen.

The majority of robotic path planners developed to date deal with navigating in completely unknown two-dimensional environments, usually consisting of mostly empty space with a few obstacles. Work in this area has concentrated on a 'universal' strategy to handle all situations, such as neural networks or inertial navigation.

One of the most reliable means of guiding vehicles is the global position satellite (GPS) system. For example, Caterpillar's U.S. Pat. No. 5,684,696 discloses a GPS guidance system for controlling the path of a vehicle. Unfortunately, the GPS system has insufficient strength to penetrate down to underground mines.

M. S. Collins, in U.S. Pat. No. 4,465,155, provides an early example of a system designed for underground operation. This system relies upon a gyroscope-controlling guidance system in combination with four transmitters mounted on a shuttle car. A plurality of sensors establish the shuttle car path and determine shuttle car functions. Baiden et al., in U.S. Pat. No. 5,530,330, disclose a self-guided scoop tram. This scoop tram relies upon a flexible lighting tube and cameras to guide it from fixed position to fixed position. Although this process has proven effective for remote control hauling of ore, disadvantages include blasting damage, dust covering the light guide and the cost of installing and updating light guides for each path. Chevrette et al.'s Canadian Pat. No. 2,049,773 discloses an optical guidance system for moving underground mine vehicles between locations. This system relies upon a vehicle following a reflector ribbon mounted on the ceiling of a mine drift. This system also requires the installation of a ribbon and periodic maintenance.

It is an object of this invention to provide a guidance system for an autonomous vehicle that requires no supporting infrastructure.

It is a further object of the invention to provide a guidance system to enable an autonomous vehicle to guide itself without any reference to the GPS or any other positioning signal.

It is a further object of the invention to provide a system capable of steering vehicles through intercepting drifts and around obstacles.

SUMMARY OF THE INVENTION

A system guides self-propelled equipment through passageways, such as underground mine corridors. The vehicle contains a signal generator for bouncing signals off the walls of the passageways. A receiver collects the signals bounced off of the passageways to determine the distance to side walls of the passageways. A storage device contains a set of interlinking nodes that represent at least one path through the passageways. Each of the nodes contains steering information. A processor finds the distance to the side walls of the passageways in order to steer the vehicle through the passageways. The system's operational state and method of steering changes depending upon the location of the equipment in the interlinking nodes.

DESCRIPTION OF PREFERRED EMBODIMENT

The system uses a two dimensional laser range finder to sense the immediate environment. In a corridor, such as a drift, crosscut or ramp, the system finds the corridor's center and steers the self-propelled equipment or vehicle towards it. When the vehicle encounters an intersection, the system turns into the next corridor as specified by a predefined route. The system creates a route by performing a breadth-first search of a connected graph that represents the layout of the area. The system labels nodes in this graph according to the area of the mine they represent (corridor, intersection, dead end, etc.).

In practice, the system uses the following stages:

1) Prior Preparation—an operator or the system creates a connected graph for the mine level and classifies the approach to each intersection.
2) Route Planning—the operator selects a destination and dispatches the vehicle. The system advantageously uses a breadth-first graph search to derive a route.
3) Autonomous Navigation—the vehicle travels along the planned route.
4) Route Complete/Interrupted—the vehicle reports its location and the reason it stopped and the system restores higher-level control. When guidance resumes, the system returns to Stage 2.

Figure 1:
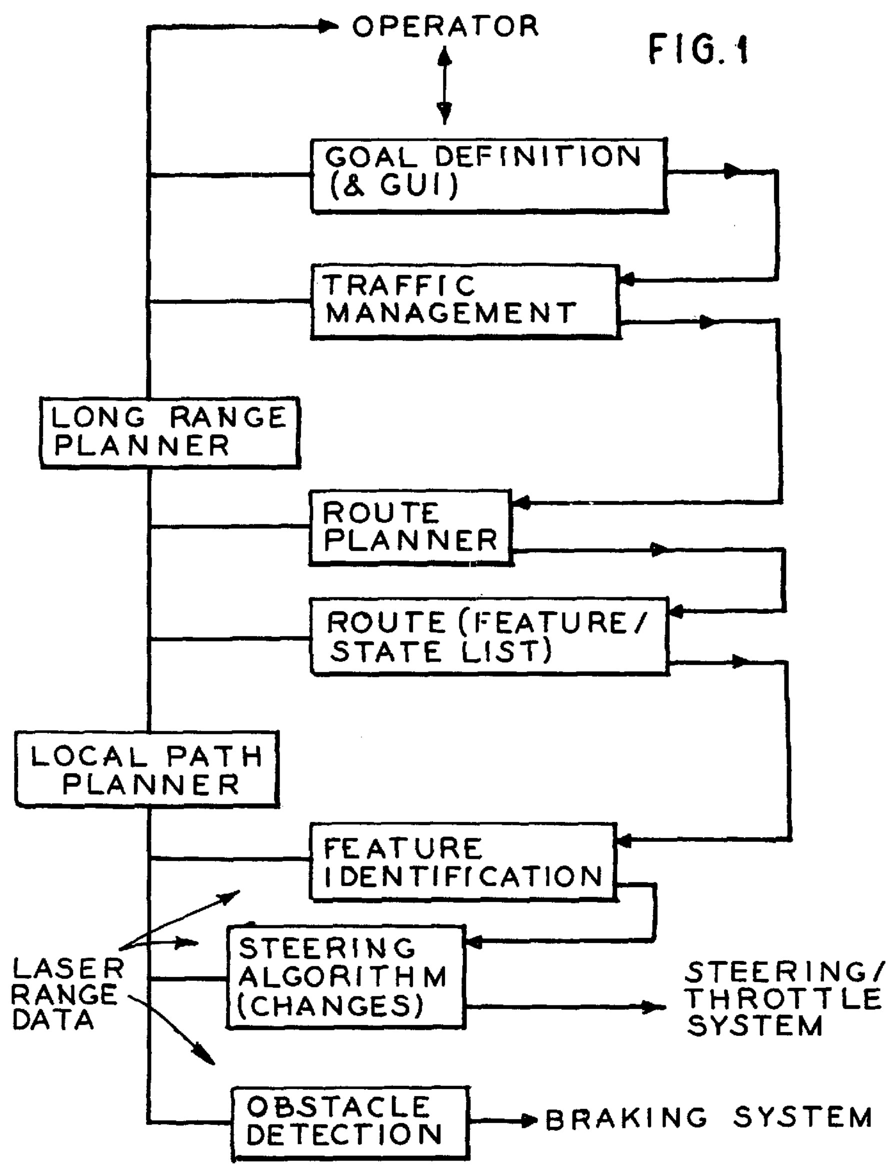
FIG. 1 is a schematic flow diagram of the control software of the invention.

Referring to FIG. 1, the system advantageously uses a layered software model similar to the subsumption model of artificial intelligence as a basis for control. Subsumption refers to a system that splits the intelligence into 'layers'. The lowest layers closely connect the systems' sensors to its actuators. Each layer has the bare minimum of resources and complexity required to carry out its task. This advantageously makes the resulting system highly reactive, efficient, modular and easier to troubleshoot. It is possible for this system to simultaneously control multiple vehicles in a single area.

The system most advantageously contains three groups of layers: 1) a mission planner that interfaces with the operator;

2) a long range planner that searches routes through the mine; and 3) a local path planner that steers the vehicle. FIG. 1 shows these three groups and the layers of intelligence applied to operate the vehicle.

Advantageously, direct connections between the sensors, lowest layers and the actuators gives the system a reflex capability—the system acts and then sends feedback back to the operator. If the system implements traffic management, it advantageously operates at the layer above the long range planner. During operation, the vehicle periodically sends its current location and destination information integrated with current traffic conditions in the mine to the route planner.

A graphical user interface (GUI) illustrates each mine level and presents this information to the operator on the surface. The GUI allows the user to specify the vehicle's current location and a destination. The operator must indicate the current location of the vehicle by clicking with the mouse on the appropriate node. Next, the operator selects a destination node with a mouse. These two nodes go to the route planner that lists the nodes that the vehicle will travel. The guidance software determines the best route for the vehicle to take based on the route planner and traffic management, if any. After the software selects the route, the GUI indicates the route on the screen and waits for confirmation or cancellation by the operator. This layer also loaded and displayed the nodes in the connected graph from an ASCII text file.

The system searches for the best route using a breadth-first search algorithm. Consistent with the definition of a breadth-first search, the system always found the shortest route if a choice was available.

Figure 2:
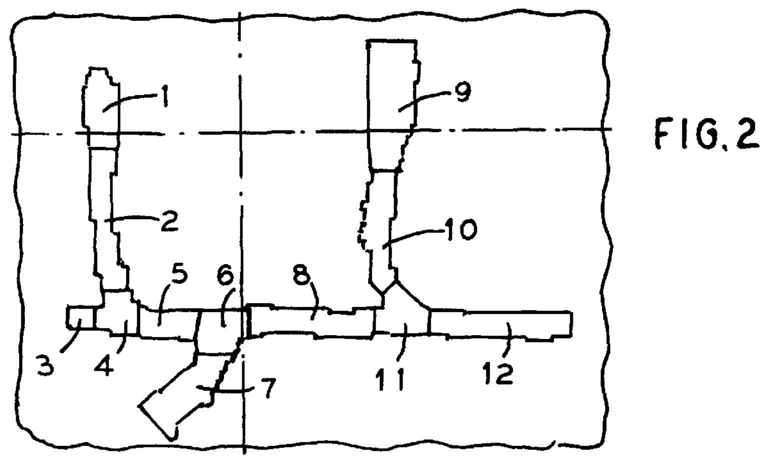
FIG. 2 is a schematic diagram of a mine.
Figure 3:
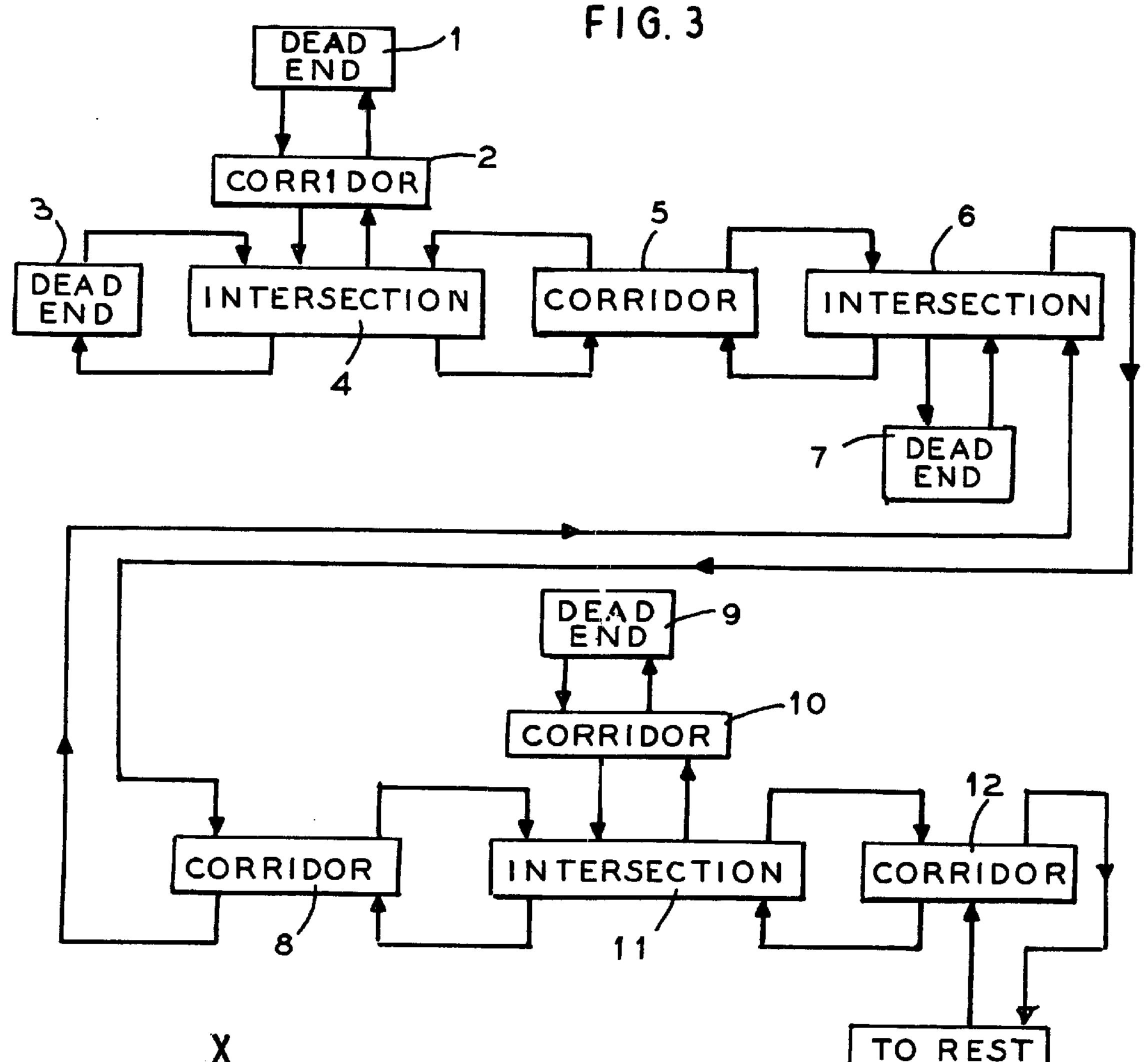
FIG. 3 is a schematic graph representation of the diagram of FIG. 2.

The guidance software derives the route from a connected graph that represents the mine. FIG. 2 shows a representative section of a mine level the vehicle must navigate. Referring to FIG. 3, the connected graph illustrates the software's interlinking of nodes to form an underground route. A storage device, such as an ASCII file stores the connected graphs with the name and type of each node and the nodes to which each connects. For example, when using an ASCII file, each node's entry may use the following format:

Intersection between Ore Pass and Repairs on Level 4000

4000-100-250 intersection 3

4000-100-200

4000-150-250

4000-75-310

Advantageously, each type of node has the following different requirements for data:

1) 'Dead end' type nodes can only link to one other node, and the data field is set to '0'.

2) Corridor nodes can only link to two other nodes, and the data fields contain the length, in meters, of the corridor—for verification by odometry.

3) The data field of an intersection node denotes the number of nodes it links to.

Figure 4:
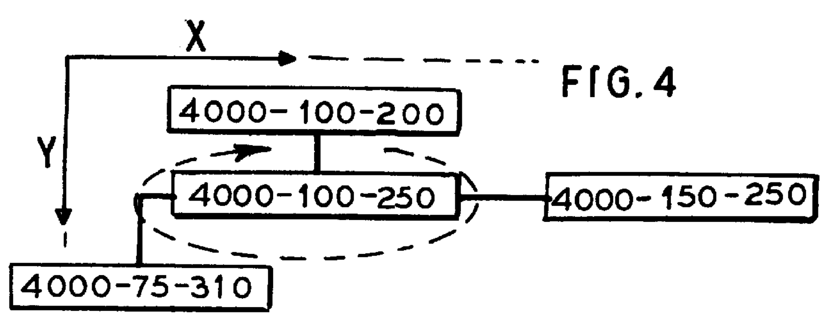
FIG. 4 is a schematic diagram that represents intersecting links at a particular mine level.

The system advantageously lists the links in an intersection node in clockwise order. This allows the route list to identify the corridor it is to link. For example, if the route is to pass through node 4000-100-250 (shown in the above example). If it is coming from 4000-150-250 and must continue to 4000-100-200, it knows that the next corridor is the first on the right is the one to take. 4000-75-310 would be the first on the left, as illustrated in FIG. 4. The software expands these routes to any number of connecting corridors.

In the event the vehicle encounters a destination corridor from an approaching corridor that the range finder cannot detect, the system advantageously stores solutions to these problems in a graph file to allow the vehicle to navigate these "blind" situations. Optionally, generating the graph file directly from drawings of the mine shortens the preparation time required to setup the system.

After the operator enters the start and end points, the layer executes a breadth-first graph search and returns a list of the nodes and states associated with each. Breadth-first searches are complete and optimal. But they require more time and storage space than depth-first searches. And the following provides an example of a route file:

0 4000-100-200 corridor

1 4000-120-200 intersection right

2 4000-160-422 corridor

3 4000-190-428 dead-end goal

Usually, the goal is a dead end node. But it is possible to have a corridor or an intersection as the goal. The vehicle stops when it enters and identifies the goal node. There are a number of different ways that the system's processor may identify and classify the next node based on the laser range data.

1. A single integer represents the number of paths available to the vehicle. This value would be 0 for a dead end, 1 for a corridor, 2 for a fork, or higher for other intersections.

2. The system stores all values from the laser ranger seen at the approach to each intersection, and then use statistical pattern matching. The system stores the corridors seen at each approach with the values, instead of the clockwise ordering.

3. The system classifies the appearance of each intersection from each approach. The system searches for features such as "goes straight", "left turn", "right turn" in the laser range data and assigns a weighting between 0–1. The value 0 means the feature does not exist at all and 1 means it perfectly matches the "stereotype" of that feature. Fuzzy logic then assigns a weighting to the validity of the intersection's location.

4. Similar to item 3 above, except that the system features a Boolean value (1,2,4,8, etc.) and sums the values. This way, the presence of a certain feature could test with a Boolean AND. Table 1 lists a set of node classifications possible with this method.

TABLE 1

| Value Returned | Situation | Classified as |
|---|---|---|
| 0 | Dead End | Dead End |
| 1 | Left Corner | Corridor |
| 2 | Corridor | Corridor |
| 3 | Left Tee | Intersection |
| 4 | Right Corner | Corridor |
| 5 | Tee | Intersection |
| 6 | Right Tee | Intersection |
| 7 | Four-Way Intersection | Intersection |

For example the laser range finder originally used two laser signals to guide itself through corridors with Boolean logic. This range finder measured and compared range valves straight ahead and to either side to determine a threshold value equal to the width of the corridor. If the range value was greater than the threshold, the system summed the Boolean values. Using this system, the prototype vehicle successfully navigated tight turns and complex intersections.

During operation, the system looks ahead in the route file to determine what the next node will be. A range finder contains a signal generator and a receiver that serve to generate signals, bounce the signals off of passageway walls, receive the reflected signal and determine the distance to the side walls. A 2-D Proximity Laser Scanner (PLS) from Sick-Optic Electronic provided the range finder. Since the proximity laser measures distances of a single plane, a shield most advantageously protects the laser from above and below. Optionally the system may use an ultrasound range finder. When the feature identifier identifies the next node type, the position in the route file moves ahead one line and the system enters in the new operational state and method of steering.

The steering algorithm used at any given pointing time depends on the current state as specified by each interlinking node of the route. The route is analogous to a finite state machine.

Figure 5:
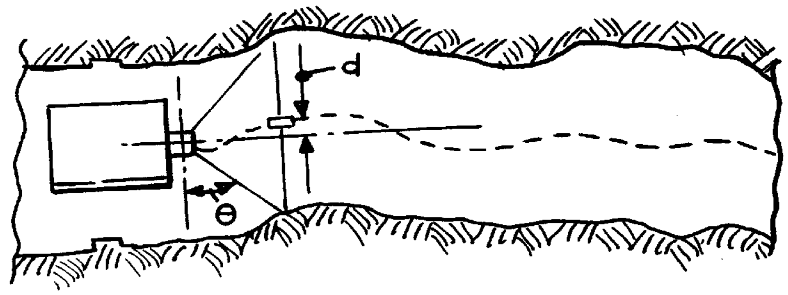
FIG. 5 is a schematic drawing of a self-guided vehicle navigating through a mine corridor.

When in a corridor, a centering algorithm keeps the vehicle centered. Referring to FIG. 5, taking two laser range readings at an appropriate distance ahead of the vehicle provides data for guiding the vehicle. The vehicle calculates the midpoint of the corridor and the distance 'd' between the midpoint and the vehicle's center axis to steer the vehicle.

An additional advantage of the guidance system is that the angle "θ" of the laser ranger reading increases as the vehicle's speed increases. The speed of a mining vehicle along a corridor is typically 20 kph. As the vehicle proceeds, it records the distance traversed via odometry as a check.

Figure 6:
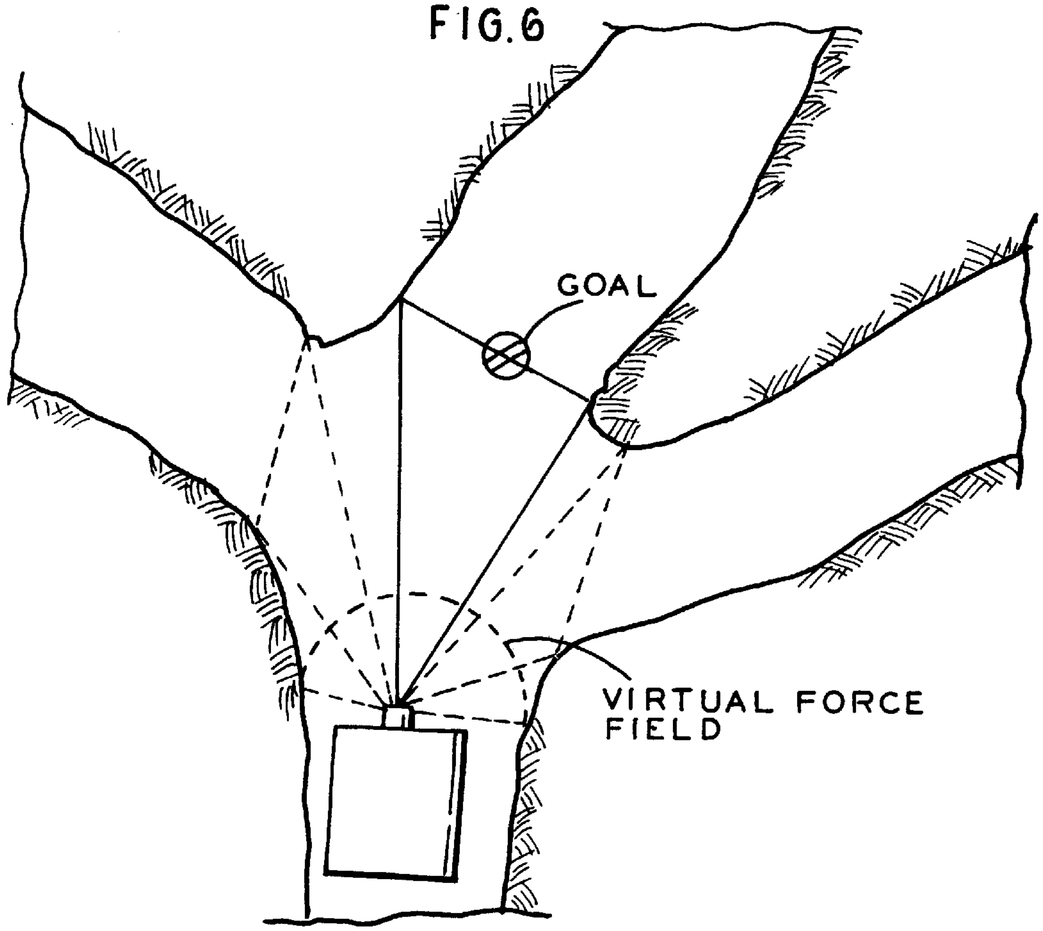
FIG. 6 is a schematic drawing of a self-guided vehicle navigating through a mine intersection.

When the vehicle reaches an intersection, as predicted by the route and verified by the feature identification, a turning algorithm directs the vehicle towards a certain goal. Referring to FIG. 6, the vehicle finds the midpoints of each of the visible corridors and the one corresponding to the desired route or goal according to the route file.

For the remainder of the state, the vehicle attempts to steer towards the goal point and at the same time steer away from objects that may be too close. This approach constitutes a "virtual force field" that protects the vehicle from objects and prevents the vehicle from injuring humans. This state requires processing time. However, mining vehicles typically move slower while turning, usually about 15 kph.

When the vehicle expects and verifies a dead end goal by the feature identification, the vehicle stops and informs the operator it has reached the goal. This must happen before the obstacle detection layer signals an imminent collision.

The feature identification layer looks at the laser range data and calculates to see if there is sufficient room for the vehicle to pass in its current path. If there is not sufficient room to pass, the vehicle applies either the emergency brakes or the normal service brakes depending on the proximity of the obstruction. If the obstacle does not move after a minute or so, the system informs the operator. Remotely, the operator assesses the situation via a remote controlled camera mounted to the vehicle. Advantageously, the operator also remotely controls a camera to view the vehicle performing its mission. The vehicle may use other means of detecting obstacles, depending on the sensors available.

A route planner takes the current and destination nodes, and performs a breadth-first search algorithm on the connected graph using the current location node as the root. The system advantageously saves the route to a disk or other recordable file.

The steering algorithm changes based on the state reported by the feature identification and the route. The steering rate advantageously increases if the range finder detects an object close to the vehicle, but not close enough to signal a collision.

While in the corridor navigation state, the software takes the laser range data and searches along the left and right sides of the corridor to find the points closest to the appropriate distance ahead. The system averages the 'x' components of these points. And this average becomes the d parameter used as a measure of the vehicle's offset from the center of the corridor. Applying this value results in a proportional, integral, derivative (PID) type of feedback control system that corrects the vehicle's heading.

When the system is in the intersection state, the direction the vehicle should take (straight, left, right) is available from the route file as a second parameter. In this implementation, the system forces the vehicle in the desired direction. The system uses a corridor navigation algorithm, except that a value equal to one-half of the corridor width replaces the 'x' component of the steering point on the side opposite the desired direction. The system handles four-way intersections and tee intersections similarly. When the system identifies a dead end, the vehicle reduces its speed to 0. Normally, a dead end appears in the route as the goal node.

Some range finders suitable for use in this system can have two zones or fields programmed into them, a warning zone and a safety zone. Independent of the controlling software, the range finder can detect objects in these zones and provide a reflex capability to the system. It acts then reports the occurrence to the software. In a complex environment, such as a mine, a modifiable third zone implemented in software detects obstacles around uneven corners. Optionally, the system may rely on signal generators mounted of a vehicle's front and rear for guiding the vehicle in forward and reverse.

During testing, the system read route files successfully. A second file stored the vehicle's current location in the route file, so that it could resume its course after an interruption. When an operator directs the vehicle to travel to a new route, the saved value resets to '0' the first node in the route.

Figure 7:
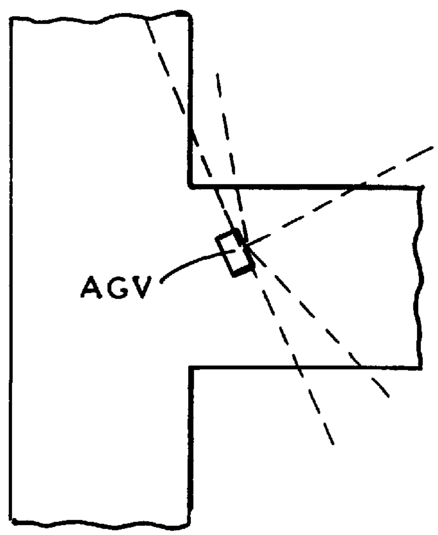
FIG. 7 is a schematic of the autonomously guided vehicle (AGV) navigating a right turn.

Referring to FIG. 7, the system could falsely report a 90° turn as a dead end when using the Boolean method of recognizing intersections. This would occur part way through an intersection, because all three scan areas (to either side and straight ahead) reported a value less than the threshold. To correct this, a value of '0' reported by the feature identifier became a 'suspected' dead end. The system then verified the situation by comparing all range values to the threshold. If all were below the threshold, the dead end classification was correct. Otherwise, the system ignored the false dead end.

Figure 8:
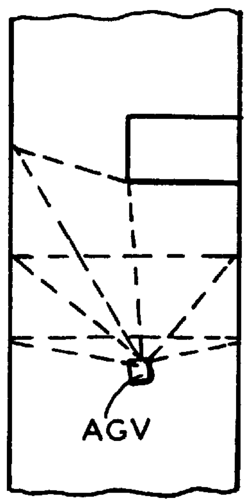
FIG. 8 is a schematic of the AGV's system using multiple pairs of distance measurements to avoid obstacles.

During testing, the vehicle easily kept centered, avoided obstacles and turned corners through intersections in several directions flawlessly. Most advantageously the range finder sends signals out in at least three different angles measured from the vehicle's forward direction to ensure the processor instructs the vehicle to steer around obstacles. The system most advantageously uses the same distance ahead as FIG. 5, twice that distance, and a third distance immediately in front of the vehicle—FIG. 8. Weighting these three "d" parameters allowed the system to navigate the vehicle around these obstacles.

This led to enhanced performance in the corridor navigation state. The furthest distance gave the steering some forewarning of approaching obstacles and the closest distance kept the vehicle from re-centering itself immediately after passing an object. Adjusting the three weights to their optimal weightings allowed the vehicle to safely pass around different shaped obstacles in corridors.

In addition to corridors, the system correctly handled intersections. But, if the vehicle encounters two intersections in a row, the system had difficulty distinguishing one from the next. To overcome this problem, the system stores the intersection classification number in addition to the state and steers the vehicle through the correct intersection. After modifying the steering logic this system recognized dead ends before it hit a wall or the obstacle detection layer stopped the vehicle. Furthermore, increasing the warning zone allowed the navigation algorithms to turn the vehicle away from the object faster before it infringed the safety zone.

In accordance with the provisions of the statute, this specification illustrates and describes specific embodiments of the invention. Those skilled in the art will understand that the claims cover changes in the form of the invention and that certain features of the invention may operate advantageously without a corresponding use of the other features.

We claim:

1. A system for guiding self-propelled equipment through passageways comprising:

a signal generator attached to a vehicle for bouncing signals off walls of the passageways;

a receiver for receiving the signals bounced of the passageways and determining distance to side walls of the passageways;

a storage device containing a set of interlinking nodes that represent at least one path through the passageways, each of said interlinking nodes containing steering information; and a processor for comparing said distance of said side walls of the passageways and the interlinking nodes to steer the vehicle through the passageways and instructing the vehicle to operate according to said steering information contained in said interlinking nodes.

2. The system of claim 1 wherein a remote control terminal instructs the vehicle to travel to destinations.

3. The system of claim 1 wherein the signal generator consists of a laser.

4. The system of claim 2 wherein the remote control terminal consists of a graphical user interface.

5. The system of claim 1 wherein the vehicle detects obstacles in front of the vehicle and the processor steers the vehicle around the obstacle.

6. The system of claim 5 wherein the signal generator sends signals out in at least three different angles as measured from the vehicle's forward direction to ensure the entire vehicle steers around the obstacle.

7. The system of claim 1 including a traffic control function that allows multiple vehicles to operate in a single area.

8. The system of claim 1 wherein the vehicle contains a signal generator on its front and rear for guiding the vehicle in forward and reverse.

9. The system of claim 1 wherein the storage device links mine corridors, intersections and dead ends.

10. The system of claim 1 wherein separate steering algorithms control steering of the vehicle in corridors and intersections.

11. A system for guiding self-propelled mining equipment through underground passageways comprising:

a laser attached to a vehicle for bouncing light off walls of the passageways;

a receiver for receiving the light bounced of the passageways and determining distance to side walls of the passageways;

a storage device containing a set of interlinking nodes that represent at least one path through the passageways; each of said interlinking nodes containing steering information; and a processor for comparing said distance of said side walls of the passageways and the interlinking nodes to steer the vehicle through the passageways and instructing the vehicle to change its method of steering according to said steering information contained in said interlinking nodes.

12. The system of claim 11 wherein a remote control terminal instructs the vehicle to travel to destinations.

13. The system of claim 12 wherein the remote controlled camera connected to the vehicle provides information concerning the location and status of the vehicle to a remote operator.

14. The system of claim 12 wherein the remote control terminal consists of a graphical user interface.

15. The system of claim 11 wherein the vehicle detects obstacles in front of the vehicle and the processor steers the vehicle around the obstacle.

16. The system of claim 15 wherein the signal generator sends signals out in at least three different angles as measured from the vehicle's forward direction to ensure the entire vehicle steers around the obstacle.

17. The system of claim 11 including a traffic control function that allows multiple vehicles to operate in a single area.

18. The system of claim 11 wherein the vehicle contains a signal generator on its front and rear for guiding the vehicle in forward and reverse.

19. The system of claim 11 wherein the storage device links mine corridors, intersections and dead ends.

20. The system of claim 11 wherein separate steering algorithms control steering of the vehicle in corridors and intersections.

* * * * *